United States Patent [19]
Höfgen et al.

[11] 4,438,435
[45] Mar. 20, 1984

[54] TWO-WAY RANGING SYSTEM

[75] Inventors: Günter Höfgen, Kornwestheim; Hinrich Ecklundt, Ludwigsburg, both of Fed. Rep. of Germany

[73] Assignee: International Standard Electric Corporation, New York, N.Y.

[21] Appl. No.: 282,342

[22] Filed: Jul. 10, 1981

[30] Foreign Application Priority Data

Jul. 23, 1980 [DE] Fed. Rep. of Germany ....... 3027823

[51] Int. Cl.³ .............................................. G01S 9/02
[52] U.S. Cl. ...................................................... 343/7.3
[58] Field of Search ................... 343/6.5 R, 7.3, 13 R

[56] References Cited
U.S. PATENT DOCUMENTS 3,742,496 6/1973 Jezo ................................. 343/6.5 R
3,919,708 11/1975 Pudsey ............................. 343/6.5 R
3,934,251 1/1976 Spratt .............................. 343/6.5 R

*Primary Examiner*—Maynard R. Wilbur
*Assistant Examiner*—M. R. Gordon
*Attorney, Agent, or Firm*—John T. O'Halloran; Alfred C. Hill

[57] ABSTRACT

The DME pulse pair is followed by a third, steep-edge pulse. The time marks are divided from the third pulse. To ensure that no random pulses are evaluated as the third pulse, the pulse pairs are still evaluated for decoding and to control tracking, while the third pulse can be evaluated only during a given time after the reception of the pulse pair. The novel interrogators and transponders can also cooperate with existing interrogators and transponders, in which case only the improvement in accuracy is lost.

18 Claims, 4 Drawing Figures

TWO-WAY RANGING SYSTEM

BACKGROUND OF THE INVENTION

The present invention relates to a two-way ranging system wherein an interrogator transmits pulse pairs as interrogation signals to a transponder, the transponder, after a fixed delay following the reception of the interrogating pulse pair, transmitting a pulse pair as a reply signal to the interrogator if the received interrogating pulse pairs have a predetermined spacing and the distance between the interrogator and the transponder is derived in the interrogator from the time difference between the transmission of the interrogating pulse pair and the reception of the reply pulse pair, taking into account any built-in equipment delays.

Such a two-way ranging system is described in a book by E. Kramar entitled "Funksysteme für Ortung und Navigation", Verlag Berliner Union GmbH, Stuttgart, 1973, on pages 147 to 159.

A two-way ranging system which has been introduced worldwide is the ICAO (International Civil Aviation Organization) standard DME (distance-measuring equipment). The operating data for DME, including the maximum bandwidth of the carrier wave of the DME pulse pairs and the shape of the DME pulse pairs, are specified in Annex 10 to "Aeronautical Telecommunications of the ICAO".

Even with an optimum shape of the pulse pairs both in the interrogator and in the transponder, there is a maximum measurement accuracy in practice. For given applications, however, it is desirable to further improve this accuracy.

SUMMARY OF THE INVENTION

An object of the present invention is to provide a two-way ranging system having a measurement accuracy higher than the measurement accuracy previously obtained.

A feature of the present invention is the provision of a two-way ranging system comprising: an interrogator to transmit an interrogation signal to a transponder, the transponder transmitting a reply signal to the interrogator after a fixed delay following the reception of the interrogation signal, the interrogation signal and the reply signal each including a pulse pair having a predetermined spacing therebetween and a third pulse following the pulse pair after a predetermined time interval, the third pulse having a leading edge steeper than the leading edge of the pulses of the pulse pair; and evaluating means disposed in the interrogator responsive to the third pulse in each of the interrogation signal and the reply signal to provide a distance measurement between the interrogator and the transponder, the distance measurement and the reply signal being accomplished only if the pulse pair has the predetermined spacing and the third pulse is spaced from the pulse pair the predetermined interval.

Compared with the conventional DME, measurement accuracy is improved considerably. The novel interrogators and transponders can also cooperate with existing DME interrogators and transponders, in which case only the improvement in accuracy has to be traded in, so that existing equipment can be used.

A particular advantage is that the DME decoding and the DME search and track modes are still used to recognize the interrogation and reply signals.

BRIEF DESCRIPTION OF THE DRAWING

Above-mentioned and other features and objects of this invention will become more apparent by reference to the following description taken in conjunction with the accompanying drawing, in which.

DESCRIPTION OF THE PREFERRED EMBODIMENT

Figure 1:
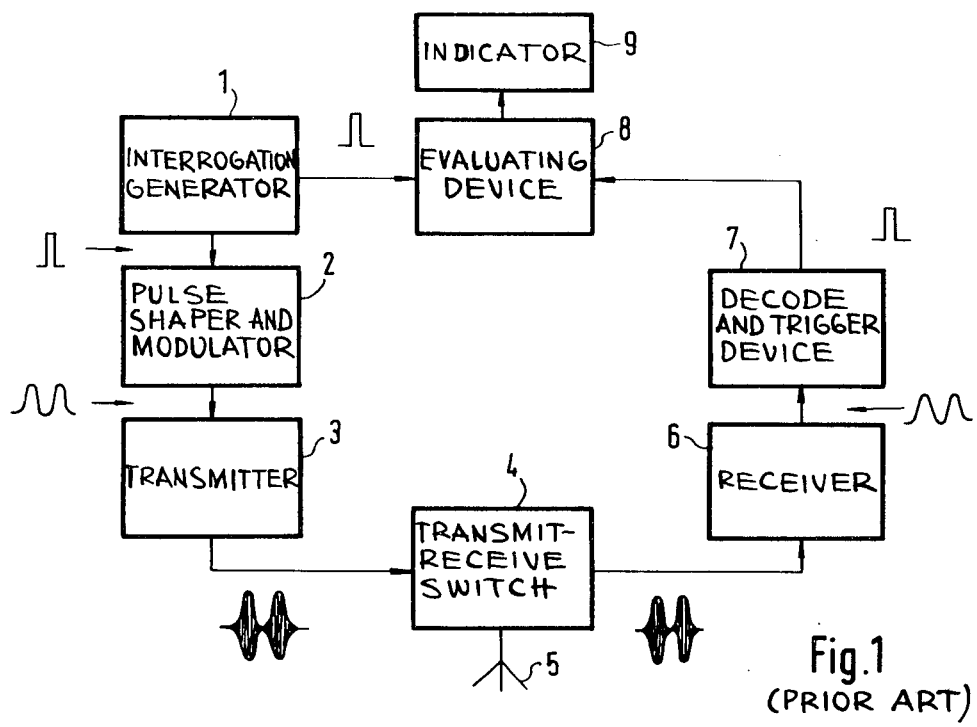
FIG. 1 is a block diagram of a conventional DME interrogator.

First, the conventional DME interrogator will be described with the aid of FIG. 1. An interrogation generator 1 controls a pulse shaper and modulator 2. The signal provided by the pulse shaper and modulator 2 is the video signal, which is the envelope of the DME interrogation signal. In a transmitter 3, the carrier wave of the DME pulse pair is modulated and amplified. The DME interrogation signal is passed through a transmit-receive switch 4 to an antenna 5, from which it is radiated.

The DME reply signal picked up by the antenna 5 is applied via the transmit-receive switch 4 to a receiver 6. A decode and trigger device 7 checks whether the two pulses of the receiver's video output signal have the prescribed spacing. Only then will the video signal be released for further evaluation. From the leading edge of the first DME pulse, the device 7 derives a trigger pulse which indicates the instant of reception of the DME reply signal. This trigger pulse as well as the trigger pulse from the interrogation generator 1, which indicates the instant of transmission of the DME interrogation signal, are passed to an evaluating device 8. To store the instant of transmission, the trigger pulse from the interrogation generator 1 starts a counter in the evaluating device 8, which is stopped by the trigger pulse from the decode and trigger device 7, whereby the instant of reception is stored, too. Evaluating device 8 derives the distance between interrogator and transponder from the time difference between the instants of transmission and reception, taking into account any built-in equipment delays in the interrogator and the transponder.

The distance is displayed on an indicator 9.

Figure 2:
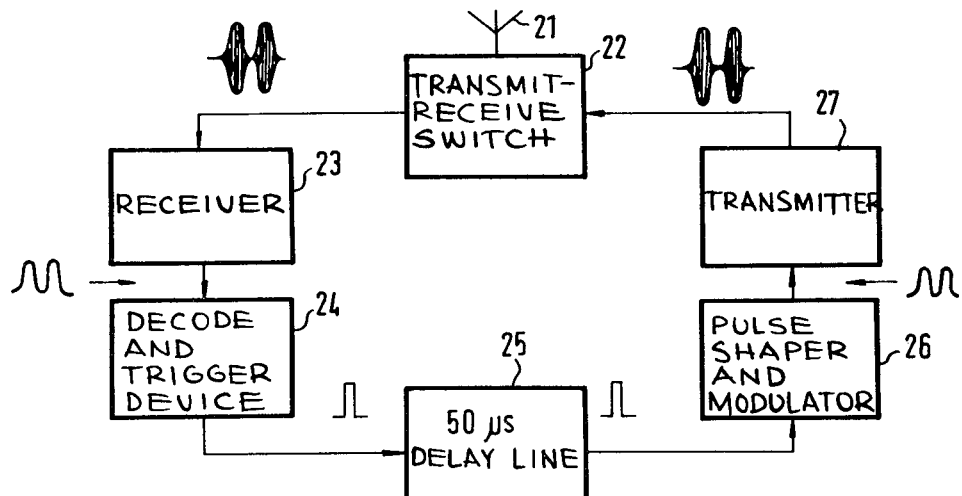
FIG. 2 is a block diagram of a conventional DME transponder.

The conventional DME transponder will now be explained with the aid of FIG. 2.

The DME interrogation signal is picked up by an antenna 21 and passed through a transmit-receive switch 22 to a receiver 23. Signal processing is similar to that in the DME interrogator. The video output signal of the receiver 23 is checked in a decode and trigger device 24 as to whether the pulses have the prescribed spacing, and a trigger pulse is derived which indicates the instant of reception. The trigger pulse is applied to a delay line 25 which controls a pulse shaper and modulator 26 for a transmitter 27 in such a way that 50 μs (microsecond) elapse between the reception of the DME interrogation signal and the transmission of the DME reply signal. The DME reply signal is applied from the transmitter 27 through the transmit-receive switch 22 to the antenna 21 and radiated from there. As mentioned earlier, the accuracy attainable with conventional DME interrogators and transponders is limited.

The following explains how the accuracy can be enhanced in accordance with the principles of the present invention.

The interrogation and reply signals of the novel two-way ranging system contains, in addition to the DME pulse pair, a third pulse having steeper edges and a broader bandwidth than the DME pulse pair. The shape of the third pulse may be rectangular or trapezoidal. Other pulse shapes are also possible. Since the third pulse has a steep leading edge, trigger pulses can be derived therefrom which indicate the instant of transmission or reception very accurately. This broadband and steep pulse cannot be processed by conventional DME equipment because the bandwidth available during signal processing is too small.

The third pulse will have the following characteristics:
Pulse duration: ~1 µs
Rise time: <100 ns (nanoseconds)
Bandwidth: 5 MHz
Spacing from the DME pulse pair: 200 µs.

The frequency of its carrier wave may be, for example, (1) a fixed frequency in the secondary-radar frequency band, (2) a fixed frequency in the C band, (3) a fixed frequency in the L band, (4) the respective DME operating frequency, or (5) different frequencies of the DME frequency band (frequency hopping).

Since the higher accuracy is generally required only at a short distance from the transponder, e.g., within 30 km (kilometers), it suffices to radiate the third pulse with a lower power than that of the DME pulse pairs. At a given distance, it is then possible to switch, by hand or automatically, from the mode "pulse pairs" to the mode "pulse pairs pulse third pulse". The respective mode is indicated to the user.

Figure 4:
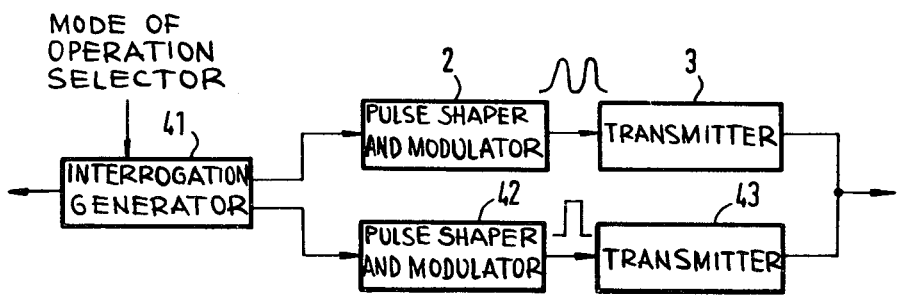

The generation of the novel interrogation signal will now be explained with the aid of FIG 4. Analogous remarks apply to the generation of the reply signal.

Like in the conventional DME interrogator of FIG. 1, the interrogation generator 41 controls the pulse shaper and modulator 2, and the transmitter 3 transmits the DME pulse pair. In the novel DME interrogator, the interrogation generator 41 controls an additional pulse shaper and modulator 42, which modulates, in an additional transmitter 43, an additional carrier wave which may differ from the carrier wave in the first transmitter 3. The additional pulse shaper and modulator 43, which generates the steep third pulse, is controlled by the interrogation generator 41 in such a way that the third pulse is separated from the DME pulse pair by the desired spacing. The interrogation signal radiated from the antenna of the novel interrogator is composed of the output signals of the transmitters 3 and 43. The interrogation generator 41 (e.g., a computer) is adjustable so as to drive either both pulse shapers and modulators 2 and 42 or only pulse shaper and modulator 2 for generating the pulse pairs. It may also be adjusted automatically as a function of distance.

If the third pulse is radiated in addition to the DME pulse pair, the instant of transmission is the instant at which the third pulse is radiated. This information is transferred to the evaluating device.

Figure 3:
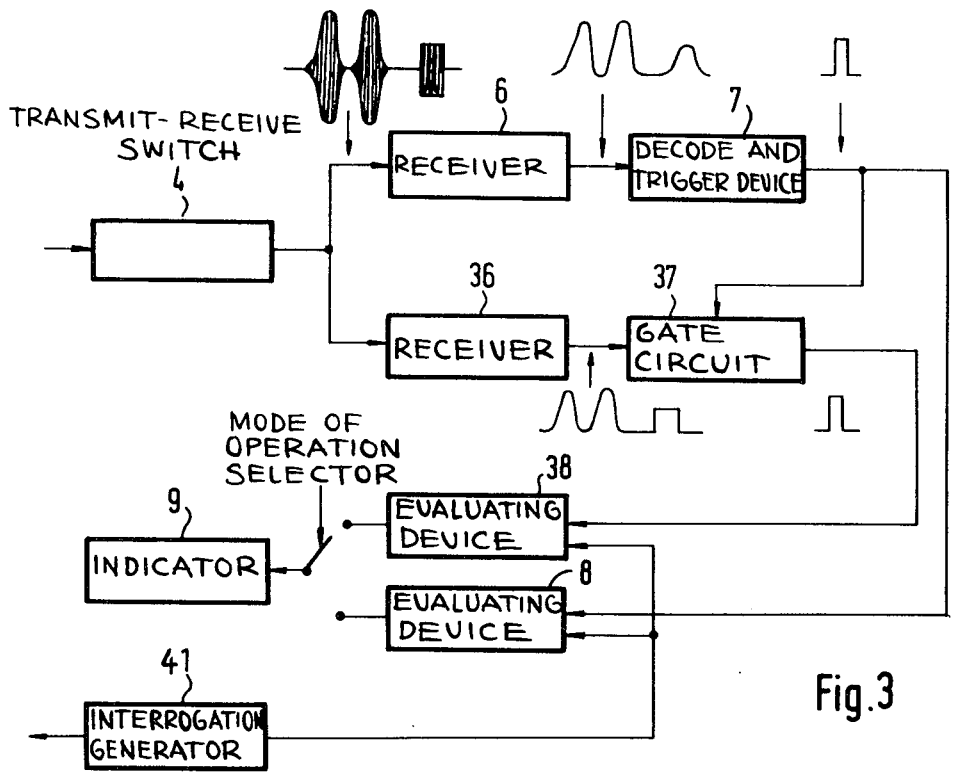
FIGS. 3 and 4 are block diagrams of parts added to the conventional DME interrogator of FIG. 1 to provide the improved two-way ranging system in accordance with the principles of the present invention.

As seen in FIG. 3, the reply signal received by the interrogator is applied by the transmit-receive switch 4 to the first receiver 6, which is followed by the decode and trigger device 7, and to a second receiver 36. If the DME pulse pair and the third pulse have carrier waves of equal frequency, one common RF unit will suffice. In the following it will be assumed that the carrier waves have the same center frequency. Consequently, both the pulse pair and the third pulse are processed in both receivers. Because of the small bandwidth in the first receiver 6, the third pulse is distorted there, so it is unsuitable for further evaluation. At the output of the second receiver 36, the third pulse is provided undistorted. When the decoder 7 has recognized that the pulse pair is a DME pulse pair, a gate circuit 37 following the second receiver 36 is opened by the trigger pulse output of decoder 7 only during the time the third pulse should be present. This prevents the evaluation of any pulses which are not the third pulse. The trigger pulse from the decode and trigger device 7, which indicates the instant of reception of the reply signal when no third pulse is present, is fed to the evaluating device 8. The third pulse is fed to an additional evaluating device 38. This same technique is used in the transponder to determine the time for transmitting the reply signal.

Depending on the mode of operation selected (only "DME pulse pair" or "DME pulse pair plus third pulse"), the result determined by the first evaluating device 8 or the second evaluating device 38 is passed on to the indicator 9.

As already mentioned in connection with the interrogation generator 41, the changeover may also be effected automatically as a function of distance.

The gate circuit 37 prevents any random pulses that may be present from being processed as the third pulse. This safeguard can be further improved by checking not only the time position in relation to the DME pulse pair, but also the center frequency of the carrier wave. If the carrier waves of the DME pulse pair and the third pulse have the same frequency, the check is made to determine whether at the instant the third pulse is present at the output of the second receiver 36, a distorted pulse is present at the output of the first receiver 6. Because of the narrow bandwidth of the first receiver 6, this distorted pulse is provided only if the pulse to be examined has the correct carrier frequency. The check can be performed by an AND gate (not shown).

If the carrier frequency of the DME pulse pair is different from that of the third pulse, the second receiver 36 contains a narrow bandpass filter for the center frequency of the carrier wave of the third pulse. Instead of the output signal of the first receiver 6, the output signal of this bandpass filter is then used for the comparison.

While we have described above the principles of our invention in connection with specific apparatus it is to be clearly understood that this description is made only by way of example and not as a limitation to the scope of our invention as set forth in the objects thereof and in the accompanying claims.

We claim:
1. A two-way ranging system comprising:
an interrogator to transmit an interrogation signal to a transponder, said transponder transmitting a reply signal to said interrogator after a fixed delay following the reception of said interrogation signal, said interrogation signal and said reply signal each including, as transmitted and as received, a pulse pair having a predetermined spacing therebetween and a third pulse spaced from said pulse pair a predetermined time interval, said third pulse having a leading edge steeper than the leading edge of the pulses of said pulse pair; and evaluating means disposed in said interrogator responsive to said third pulse in each of said interrogation signal and said reply signal to provide a distance measurement between said interrogator and said transponder, said distance measurement and said reply signal being accomplished only if said pulse pair has said predetermined spacing and said third pulse is spaced from said pulse pair said predetermined interval.

2. A system according to claim 1, wherein
said evaluating means includes
first means to store the instant said third pulse of said interrogation signal is transmitted,
second means to detect if said pulse pair of said reply signal has said predetermined spacing, and
third means coupled to said first means and said second means to process said third signal of said reply signal for a given time, said first means storing the instant said third pulse of said reply signal is received and to determine said distance measurement from said instants stored therein and known built-in equipment delays.

3. A system according to claim 2, wherein
said third means includes
a first gate circuit responsive to the output of said second means to open said first gate circuit for said given time.

4. A system according to claim 2, wherein
said first, second and third means are added to a conventional interrogator to generate and process said third pulse.

5. A system according to claim 3, wherein
said transponder includes
fourth means responsive to said interrogation signal to enable said third pulse of said interrogation signal to be processed for a given period if said pulse pair of said interrogation signal has said predetermined spacing, and
fifth means coupled to said fourth means responsive to said third pulse of said interrogation signal to control the instant of transmission of said reply signal so that a predetermined period of time is present between reception of said third pulse of said interrogation signal and transmission of said third pulse of said reply signal.

6. A system according to claim 5, wherein
said fourth means includes
a second gate circuit responsive to a timing signal spaced in time from said pulse pair of said interrogation signal by said predetermined period of time.

7. A system according to claim 6, further including
sixth means disposed in said interrogator and said transponder to permit processing of said third pulse only if said third pulse has a carrier wave center frequency of a selected value.

8. A system according to claim 7, wherein
said first, second, third, fourth, fifth and sixth means are added to a conventional interrogator and transponder to generate and process said third pulse.

9. A system according to claim 2, wherein
said transponder includes
fourth means responsive to said interrogation signal to enable said third pulse of said interrogation signal to be processed for a given period if said pulse pair of said interrogation signal has said predetermined spacing, and
fifth means coupled to said fourth means responsive to said third pulse of said interrogation signal to control the instant of transmission of said reply signal so that a predetermined period of time is present between reception of said third pulse of said interrogation signal and transmission of said third pulse of said reply signal.

10. A system according to claim 9, wherein
said fourth means includes
a gate circuit responsive to a timing signal spaced in time from said pulse pair of said interrogation signal by said predetermined period of time.

11. A system according to claim 10, further including
sixth means disposed in said interrogator and said transponder to permit processing of said third pulse only if said third pulse has a carrier wave center frequency of a selected value.

12. A system according to claim 11, wherein
said first, second, third, fourth, fifth and sixth means are added to a conventional interrogator and transponder to generate and process said third pulse.

13. A system according to claim 2, further including
fourth means disposed in said interrogator and said transponder to permit processing of said third pulse only if said third pulse has a carrier wave center frequency of a selected value.

14. A system according to claim 13, wherein
said first, second, third and fourth means are added to a conventional interrogator and transponder to generate and process said third pulse.

15. A system according to claim 1, wherein
said transponder includes
first means responsive to said interrogation signal to enable said third pulse of said interrogation signal to be processed for a given period if said pulse pair of said interrogation signal has said predetermined spacing, and
second means coupled to said first means responsive to said third pulse of said interrogation signal to control the instant of transmission of said reply signal so that a predetermined period of time is present between reception of said third pulse of said interrogation signal and transmission of said third pulse of said reply signal.

16. A system according to claim 15, wherein
said first means includes
a gate circuit responsive to a timing signal spaced in time from said pulse pair of said interrogation signal by said predetermined period of time.

17. A system according to claim 16, further including
third means disposed in said transponder to permit processing of said third pulse only if said third pulse has a carrier wave center frequency of a selected value.

18. A system according to claim 17, wherein
said first, second and third means are added to a conventional transponder to generate and process said third pulse.

* * * * *